United States Patent Office 3,426,019
Patented Feb. 4, 1969

3,426,019
DERIVATIVES OF PTERIDINE AND A METHOD FOR THEIR PREPARATION
Irwin J. Pachter, Erdenheim, and Joseph Weinstock, Phoenixville, Pa., assignors to Smith Kline & French Laboratories, Philadelphia, Pa., a corporation of Pennsylvania
No Drawing. Continuation-in-part of application Ser. No. 142,541, Oct. 3, 1961. This application June 29, 1962, Ser. No. 206,153
U.S. Cl. 260—240    16 Claims
Int. Cl. C07d 57/28, 51/42

ABSTRACT OF THE DISCLOSURE 7-aminopteridine derivatives as diuretic and hypotensive agents are described.

---

This invention relates to a novel process for the preparation of 7-aminopteridine derivatives, to novel intermediates useful in said process and to new 7-aminopteridine derivatives prepared by said process.

This application is a continuation-in-part of Ser. No. 142,541, filed Oct. 3, 1961, and now abandoned.

The 7-aminopteridine derivatives prepared by the process and through the intermediates which are objects of this invention are valuable pharmacodynamic agents, in particular they are useful as diuretic and hypotensive agents. Certain of these pteridine derivatives have been described as potent diuretic agents in U.S. Patents No. 2,975,180 and No. 2,963,481. Certain of the 6-amino-5-cyanomethylaminopyrimidines in particular the 2,4,6-triamino-5 - cyanomethylaminopyrimidines which are prepared by the process of this invention and are intermediates in said process for the preparation of 7-aminopteridines have diuretic activity in their own right. The end products also have valuable utility as intermediates for preparing other organic compounds having utility as dyestuffs or as antifolic acid compounds. In addition the 6-thiazolylpteridine end products have utility as central nervous system stimulants.

The process of this invention for the preparation of 7-aminopteridines is schematically represented as follows:

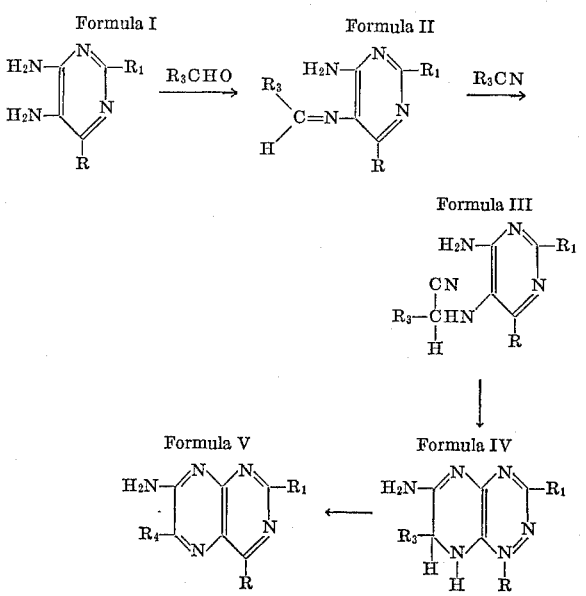

when:
R represents hydrogen, lower alkyl, phenyl, thienyl, carbamoyl, hydroxyl or preferably

$R_1$ represents hydrogen, lower alkyl, phenyl, thienyl or amino;
$R_2$ represents hydrogen or lower alkyl, the same or different, hydrogen is preferred;
$R_3$ represents hydrogen or an organic moiety having a maximum of 12 carbon atoms, such as lower alkyl, halogenated lower alkyl such as trifluoromethyl, cycloalkyl, $\alpha,\beta$-lower alkenyl, $\alpha,\beta$-cycloalkenyl, phenyl-$\alpha,\beta$-lower alkenyl, $\alpha,\beta$-lower alkynyl, phenyl-$\alpha,\beta$-lower alkynyl, lower alkenylalkylene, cycloalkenylalkylene, phenyl-lower alkenylalkylene, lower alkynylalkylene, phenyl-lower alkynylalkylene, phenyl, thienyl, furyl, pyrrolyl, pyrimidyl, pyridyl, quinolyl, thiazolyl, benzyl, phenethyl, thenyl or carbamoyl;
$R_4$ corresponds to $R_3$ when $R_3$ is hydrogen, lower alkyl, halogenated lower alkyl, cycloalkyl, lower alkenylalkylene, cycloalkenylalkylene, pheny-lower alkenylalkylene, lower alkynylalkylene, phenyl-lower alknylalkylene, phenyl, thienyl, furyl, pyrrolyl, pyrimidyl, pyridyl, quinolyl, thiazolyl, benzyl, phenethyl, thenyl or carbamoyl and, when $R_3$ is an $\alpha,\beta$-lower alkenyl, $\alpha,\beta$-cycloalkenyl, phenyl-$\alpha,\beta$-lower alkenyl, $\alpha,\beta$-lower alkynyl or phenyl-$\alpha,\beta$-lower alkynyl, $R_4$ is lower alkyl, cycloalkyl, phenyl-lower alkyl, $\alpha,\beta$-lower alkenyl or phenyl-$\alpha,\beta$-lower alkenyl respectively and
$R_5$ represents hydrogen or alkali metal such as sodium or potassium.

Preferred compounds of Formulas I-V are as follows:
R represents

$R_1$ represents phenyl or amino;
$R_2$ represents hydrogen or methyl; and
$R_3$ and $R_4$ represent hydrogen, methyl, phenyl thienyl, pyrrolyl or carbamoyl.

The aryl moieties of $R_1$, $R_3$ and $R_4$ such as the phenyl moiety are, optionally, inertly substituted, that is substituted by moieties which are not reactive under the conditions of the process of this invention. Exemplary of "inert" substituents are lower alkyl, lower alkoxy, halogen and trifluoromethyl.

The terms "lower alkyl," "lower alkenyl," "lower alkynyl," "alkylene" and "lower alkoxy" where used herein and in the claims denote moieties having from 1–6, preferably 1–3, carbon atoms. The term "halogenated lower alkyl" denotes moieties having 1–6, preferably 1–3, carbon atoms substituted by a halo moiety such as chloro, bromo or fluoro. The terms "cycloalkyl" and "cycloalkenyl" denote moieties having 5–6 carbon atoms.

The pteridine products of Formula V which are objects of this invention could not be prepared by prior art procedures but are now available due to this invention. These compounds have the following formula:

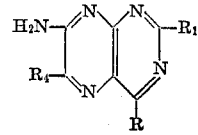

in which:

R represents hydrogen, lower alkyl, phenyl, thienyl, carbamoyl, hydroxyl or

$R_1$ represents hydrogen, lower alkyl, phenyl, thienyl or amino;

$R_2$ represents hydrogen or lower alkyl, the same or different;

$R_4$ represents halogenated lower alkyl, and especially unsaturated alkyl or aralkyl moieties such as α,β-lower alkenyl, phenyl-α,β-lower alkenyl, lower alkenylalkylene, cycloalkenylalkylene, pheny-lower alkenylalkylene, lower alkynylalkylene or phenyl-lower alkenylalkylene.

Also included in this invention are the nontoxic pharmaceutically acceptable, acid addition salts of the above pteridines. These salts are prepared by reacting the base in an organic solvent such as ethyl ether, ethyl acetate or a lower alkanol with an excess of the acid. Exemplary of suitable acids are hydrochloric, acetic, hydrobromic, sulfuric, phosphoric, sulfamic, ethanedisulfonic, maleic, citric, etc. acids.

The novel Schiff base and 6-amino-5-cyanomethyl-aminopyrimidine intermediates of Formulas II and III, respectively, are also objects of this invention. The acid addition salts of these compounds are further objects of this invention. Such salts are prepared by reacting the bases with an organic or inorganic acid in a lower alkanol such as ethanol, methanol or isopropanol with isolation of the salt by cooling and filtering. Exemplary of such salts are those prepared with maleic, citric, acetic, hydrochloric or hydrobromic acids.

The 7-amino-5,6-dihydropteridines of Formula IV are intermediates in the preparation of the diuretic pteridines of Formula V. The position of the double bond in the pyrazine ring of the dihydropteridine nucleus is at present not definitely known. The compounds have been designated herein in most instances as 5,6-dihydropteridines, however the compounds may equally well be 5,8-dihydropteridines. Particularly where $R_3$ is an aryl moiety, the product is likely to be the 5,8-dihydropteridine which would provide conjugation of the double bond with the aryl moiety, $R_3$.

It is apparent that the compound of Formula IV in which $R_3$ is an α,β-unsaturated moiety will readily shift a double bond to form the pteridine compounds of Formula V. Therefore the α,β-alkenyl and -alkynyl compounds of Formula IV will isomerize to produce alkyl and α,β-alkenyl pteridines, respectively, of Formula V.

The compounds of Formula IV in which the $R_3$ moiety contains an unconjugated unsaturated bond are designated as "lower alkenylalkylene," "cycloalkenylalkylene," "phenyl-lower alkenylakylene," "lower alkynylalkylene" and "phenyl-lower alkynylakylene" to distinguish them from the α,β-unsaturated moieties. The distinction between the α,β-unsaturated moieties and other unsaturated groups in the process of this invention is the ability of the former to isomerize to give the pteridine products, while the latter must undergo the additional step of oxidation of the dihydropteridines to form the pteridines of Formula V.

Also included in this invention are the process and intermediates as described above in which the N-atoms of the pyrazine ring of the dihydropteridines of Formula IV are substituted by lower alkyl or aralkyl moieties such as benzyl or phenethyl. Dihydropteridines which contain a substituent in the 8 position are prepared as by-products of the cyclization of a 4-monoalkylamino-5-cyanomethyl-aminopyrimidine. 5-substituted-dihydropteridines are prepared by reduction of the Schiff bases of Formula II followed by reaction of the resulting 5-alkylaminopyrimidine with $R_3CHO$ and $R_5CN$ to give the intermediate 5-(alkyl-cyanomethylamino)-pyrimidine which is then cyclized to the 5-alkyldihydropteridine.

The process of this invention is most conveniently carried out without isolating the Schiff base intermediates of Formula II. The preparation of the 5-cyanomethylpyrimidines of Formula III is then accomplished in one step as follows:

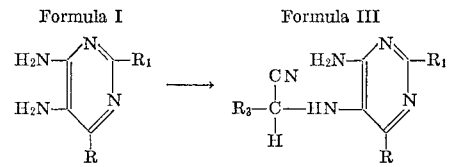

Formula I    Formula III

The terms R, $R_1$ and $R_3$ are as defined hereabove.

The starting materials for the process of this invention, namely the 5,6-diaminopyrimidines of Formula I, are either known to the art or are prepared by standard procedures such as by reduction of the corresponding 5-nitroso compounds disclosed in U.S. Patent No. 2,975,180. The 6-amino-5-nitrosopyrimidines are reduced to the 5,6-diaminopyrimidine starting materials of Formula I by means of chemical reducing agents or by catalytic hydrogenation.

According to the process of this invention the 5,6-diaminopyrimidine of Formula I is reacted with at least one molar equivalent of hte carbonyl compound having the formula $R_3CHO$ in which $R_3$ is as defined hereabove in an inert solvent in which the reactants are substantially soluble preferably in a lower alkanol such as ethanol or methanol. The reaction mixture is preferably heated, such as on a steam bath, at about 45–90° C. for about 3–15 minutes. The Schiff base of Formula II is formed and is optionally isolated by concentrating the mixture, filtering and recrystallizing the solid product from a suitable solvent such as lower alkanol, for example ethanol or isopropanol.

The Schiff base of Formula II is reacted with $R_5CN$ in which $R_5$ is an alkali metal such as soidum or potassium or is, preferably, hydrogen together with an acid such as a dilute mineral acid for example hydrochloric, sulfuric or phosphoric acids or preferably, a lower alkanoic acid such as acetic acid. A lower alkanol solvent such as ethanol or methanol is advantageously added to the reaction mixture. The reaction is preferably carried out at elevated temperature, advantageously at about 45–90° C. for about 5–30 minutes. The 6-amino-5-cyanomethylaminopyrimidine of Formula III is isolated from the reaction mixture by cooling and filtering.

The 5-cyanomethylaminopyrimidine can be formed directly by the reaction of the 5,6-diaminopyrimidines of Formula I with a carbonyl compound, i.e. $R_3CHO$, a cyanide compound, i.e. $R_5CN$, and an acid such as mineral acid or a lower alkanoic acid at about 45° C. to about 90° C. for about 5–30 minutes, $R_3$ and $R_5$ being as defined hereabove.

The 6-amino-5-cyanomethylaminopyrimidine intermediate of Formula III is treated with an alkali metal lower alkoxide, such as sodium or potassium methoxide or ethoxide, or an alkali metal cyanide such as sodium or potassium cyanide in a lower alkanol solution such as methanol or ethanol solution. The reaction is preferably carried out at elevated temperatures such as at about 45–85° C., conveniently at the reflux temperature of the reaction mixture. The reaction is usually allowed to proceed for about 5–10 minutes. The mixture is concentrated in vacuo to give the intermediate crude 7-amino-5,6-dihydropteridine of Formula IV. The dihydropteridines of Formula IV in which $R_3$ is an α,β-unsaturated moiety rearrange directly to the pteridines of Formula V. Other dihydropteridines are converted to the pteridines by oxidation. The dihydro compound is air oxidized by heating, in an inert solvent having a boiling point of about 150–265° C., such as phenyl ether or dimethylformamide, conveniently at the reflux temperature of the solvent and the pteridine product is isolated by cooling and filtering. Alternatively, the dihydropteridine is converted to the peteridine by treating with an oxidizing agent such as potassium ferricyanide, potassium permanganate or, conveniently, aqueous hydrogen peroxide.

Alternatively, the cyanomethylaminopyrimidine intermediates of Formula III are prepared as follows:

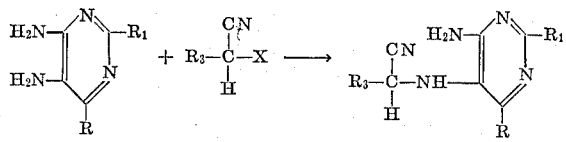

when:

R, $R_1$ and $R_3$ are as described hereabove;
X is halogen, hydroxy, $OSO_2C_6H_5$, $OSO_2C_6H_4CH_3$ or

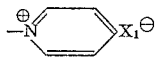

and $X_1$ is a reactive halogen such as bromo, chloro or iodo.

The 5,6-diaminopyrimidine is reacted with an acetonitrile derivative, i.e. α-X-acetonitrile, in which X is as defined above, in a lower alkanol solvent such as ethanol or methanol. Advantageously, an acid binding agent such as sodium or potassium carbonate is present in the reaction mitxure. The reaction is carried out at elevated temperature, conveniently at reflux temperature of the reaction mixture, for a period of about 10–60 minutes.

The following terms as used herein and in the claims are thus defined:

"Lower alkanol"—a straight or branched chain aliphatic alcohol having 1–6, preferably 1–3, carbon atoms.

"Lower alkanoic acid"—a fatty acid having 2–4, preferably 2–3, carbon atoms.

"Lower alkoxide"—an alkoxide moiety having 1–6, preferably 1–3, carbon atoms.

Reaction conditions other than those described are operative but without particular advantage over those described hereabove. The following examples will illustrate the novel process and intermediates of this invention and will serve to make them fully apparent to one skilled in the art. These examples are not to be construed as limiting the operability of this invention but, on the contrary, are indicative of its wide scope of usefulness.

EXAMPLE 1

A mixture of 5.0 g. of 2,4,5,6-tetra-amino pyrimidine hydrochloride, 6.0 g. of benzaldehyde and 10 ml. of acetic acid is heated on a steam bath until solution is achieved. Hot absolute ethanol (75 ml.) is added and the mixture is heated to boiling. A stream of hydrogen cyanide gas is passed into the solution for about ten minutes during which the temperature falls to 65° C. The reaction mixture is allowed to stand at room temperature for five hours, then is filtered to give 2,4,6-triamino-5-(α-cyanobenzylamino)pyrimidine hydrochloride, M.P. 197° C. (dec.).

Five grams of 2,4,6-triamino-5-(α-cyanobenzylamino) pyrimidine hydrochloride, 2.5 g. of sodium methoxide and 40 ml. of methanol are heated at reflux for ten minutes. The mixture is cooled and filtered. The solid material obtained is refluxed for five minutes with 40 ml. of phenyl ether to give, on cooling and filtering, 2,4,7-triamino-6-phenylpteridine.

EXAMPLE 2

A mixture of 15.0 g. of 2,4,5,6-tetra-aminopyrimidine, 15.0 g. of benzaldehyde and 30 ml. of acetic acid is heated to obtain a solution. To this solution is added 300 ml. of hot 95% ethanol and 15.0 of potassium cyanide. The mixture is refluxed for five minutes, then allowed to stand for three hours and filtered to give 2,4,6-triamino-5-(α-cyanobenzylamino)pyrimidine acetate which is recrystallized from ethyl acetate, M.P. 162–164° C. (dec.).

A 5.0 g. sample of 2,4,6-triamino-5-(α-cyanobenzylamino)pyrimidine acetate and 2.5 g. of sodium methoxide are added to 40 ml. of methanol. The mixture is refluxed for ten minutes and then is allowed to stand for eight hours. The resulting solid material is filtered off, then refluxed in phenyl ether solution for five minutes. Cooling and filtering gives 2,4,7-triamino-6-phenylpteridine.

EXAMPLE 3

A solution of 10.0 g. of 4,5,6-triamino-2-phenylpyrimidine in 75 ml. of methanol and 25 ml. of acetic acid is treated with 5.0 g. of sodium cyanide in 25 ml. of water and 10 g. of benzaldehyde in 20 ml. of methanol. The mixture is allowed to stand at room temperature for about 16 hours. The precipitate which forms is filtered off to give 4,6-diamino-5-(α-cyanobenzylamino)-2-phenylpyrimidine which is recrystallized from dimethylformamide-methanol to give yellow plates, M.P. 201–203° C.

A 5.0 g. sample of 4,6-diamino-5-(α-cyanobenzylamino)-2-phenylpyrimidine, 5.0 g. of sodium methoxide and 80 ml. of methanol is heated at reflux for 10 minutes. To the hot solution is added 80 ml. of water and 10 ml. of 30% hydrogen peroxide. The mixture is allowed to stand at room temperature for five hours. Filtration and recrystallization from methanol gives 4,7-diamino-2,6-diphenylpteridine.

EXAMPLE 4

Ten grams of 2,4,5,6-tetra-aminopyrimidine, 12.0 g. of benzaldehyde and 35 ml. of ethanol are heated on a steam bath for five minutes. Cooling and filtering gives 2,4,6-triamino-5-benzylideneaminopyrimidine. This Schiff base may be converted to its hydrochloride salt by heating with ethanolic hydrogen chloride, then cooling and filtering.

The Schiff base prepared above is dissolved in acetic acid. Hot ethanol is added. The resulting mixture is heated to the boiling point and treated with a stream of hydrogen cyanide gas. Working up as in Example 1 gives 2,4,6-triamino-5-(α-cyanobenzylamino)pyrimidine.

Refluxing 7.5 g. of the above prepared cyano compound with 4.2 g. of sodium ethoxide and 60 ml. of ethanol for eight minutes, then cooling, concentrating and refluxing the residue in phenyl ether for five minutes gives, upon cooling and filtering, 2,4,7-triamino-6-phenylpteridine.

EXAMPLE 5

A mixture of 10.6 g. of p-chlorobenzaldehyde, 19.0 g. of phenylsulfonyl chloride and 9.0 g. of potassium cyanide in 300 ml. of ethanol is heated on a steam bath for one hour. Cooling, concentrating and filtering gives p-chloro-α-cyanobenzyl phenylsulfonate.

Treating 14.0 g. of 2,4,5,6-tetra-aminopyrimidine with the above prepared p-chloro-α-cyanobenzyl phenylsulfonate in ethanol solution containing sodium carbonate at reflux temperature for 15 minutes, gives, after cooling and filtering, 2,4,6-triamino-5-(p-chloro-α-cyanobenzylamino)pyrimidine. In the manner of Example 2 this pyrimidine is converted to 2,4,7-triamino-6-(p-chlorophenyl)pteridine.

EXAMPLE 6

An ethanol solution of 14.0 g. of 2,4,5,6-tetra-aminopyrimidine and 8.0 g. of 1-methyl-2-pyrrolecarboxaldehyde is heated at 95° C. for five minutes to give 2,4,6-triamino-5-(1-methyl-2-pyrrolylmethyleneamino)pyrimidine.

An acetic acid-ethanol solution of the above prepared pyrimidine is treated with a stream of hydrogen cyanide gas to give 2,4,6-triamino-5-(α-cyanol-1-methyl-2-pyrrolylmethylamino)pyrimidine.

Refluxing the above prepared cyano compound with 3.5 g. of sodium ethoxide and 50 ml. of ethanol for ten minutes gives 2,4,7-triamino-5,6-dihydro-6-(1-methyl-2- pyrrolyl)pteridine which is refluxed with phenyl ether to yield 2,4,7-triamino-6-(1-methyl-2-pyrrolyl)pteridine.

EXAMPLE 7

By the method of Example 4, using as starting materials in equimolar amounts in place of benzaldehyde:

formaldehyde
acetaldehyde
3-chloropropionaldehyde
propargyl aldehyde
cyclohexanecarboxaldehyde
2-quinolinecarboxaldehyde
2-furaldehyde
3-phenylpropionaldehyde
5-pyrimidinecarboxaldehyde the following compounds are prepared:

2,4,7-triaminopteridine
2,4,7-triamino-6-methylpteridine
2,4,7-triamino-6-(2-chloroethyl)pteridine
2,4,7-triamino-6-vinylpteridine
2,4,7-triamino-6-cyclohexylpteridine
2,4,7-triamino-6-(2-quinolyl)pteridine
2,4,7-triamino-6-(2-furyl)pteridine
2,4,7-triamino-6-phenethylpteridine
2,4,7-triamino-6-(5-pyrimidyl)pteridine and the corresponding dihydropteridines.

EXAMPLE 8

When the following compounds are used as starting materials in equimolar amounts in place of benzaldehyde in Example 4:

4-thiazolecarboxaldehyde
2-thiazolecarboxaldehyde
5-thiazolecarboxaldehyde
2-thiopheneacetaldehyde
2-pyridinecarboxaldehyde the products obtained are respectively:

2,4,7-triamino-6-(4-thiazoyl)pteridine
2,4,7-triamino-6-(2-thiazolyl)pteridine
2,4,7-triamino-6-(5-thiazolyl)pteridine
2,4,7-triamino-6-(2-thenyl)pteridine
2,4,7-triamino-6-(2-pyridyl)pteridine.

EXAMPLE 9

Following the method of Example 4, 10.0 g. of 4,5,6-triamino-2-phenylpyrimidine and 5.0 g. of glyoxylamide are reacted. Upon completion of the steps outlined in Example 4, the intermediate 4,7-diamino-5, 6-dihydro-2-phenyl-6-pteridinecarboxamide is converted to 4,7-diamino-2-phenyl-pteridinecarboxamide.

Similarly using 10.0 g. of 4,5,6-triamino-2-(2-thienyl) pyrimidine, prepared by reduction of 4,6-diamino-5-nitroso-2-(2-thienyl)pyrimidine, and 5.0 g. of glyoxylamide in the procedure of Example 4, there is obtained 4,7-diamino-2-(2-thienyl)-6-pteridinecarboxamide.

In the same manner, 5,6-diamino-4-methylamino-2-phenylpyrimidine and 5,6-diamino - 4 - dimethylamino-2-phenylpyrimidine, prepared by reduction of the corresponding 5-nitrosopyrimidines, are reacted with glyoxylamide to give 7-amino-4-methylamino-2-phenyl-6-pteridinecarboxamide and 7 - amino - 4 - dimethylamino-2-phenyl--6-pteridinecarboxamide, respectively.

EXAMPLE 10

Reacting 15 ml. of formaldehyde with 4.0 g. of 4,5,6-triaminopyrimidine by the procedure of Example 4 gives, as the final product, 4,7-diaminopteridine.

Similarly substituting benzaldehyde in place of formaldehyde yields 4,7-diamino-6-phenylpteridine.

EXAMPLE 11

Ten grams of 2,4,5,6-tetra-aminopyrimidine and 7.5 g. of 2-thiophenecarboxaldehyde are heated in ethanol solution for five minutes at 90–95° C. to give 2,4,6-triamino-5-(2-thienylmethyleneamino)pyrimidine.

A stream of hydrogen cyanide gas is passed into a dilute solution of hydrochloric acid in ethanol containing the above prepared pyrimidine to give, after cooling and filtering, 2,4,6-triamino-5-(α - cyano - 2 - thienylmethylamino)pyrimidine. This cyano compound is refluxed with 3.0 g. of sodium cyanide in ethanol for five minutes to give the intermediate 2,4,7 - triamino - 5,8 - dihydro-6-(2-thienyl)pteridine which is refluxed with phenyl ether for five minutes to give 2,4,7-triamino-6-(2-thienyl)pteridine.

In a similar manner using 7.5 g. of 3-thiophenecarboxaldehyde as the starting material, 2,4,7-triamino-6-(3-thienyl)pteridine is prepared.

EXAMPLE 12

A mixture of 10 g. of 2,4,5,6-tetra-aminopyrimidine, 14.0 g. of p-trifluoromethylbenzaldehyde and 20 ml. of acetic acid is heated. The resulting solid is taken up in 1200 ml. of boiling ethanol and hydrogen cyanide gas is passed into the solution for 2–5 minutes. The mixture is filtered and allowed to stand overnight. The precipitate is isolated by filtration to give 5-(α-cyano-4-trifluoromethylbenzylamino)-2,4,6-triaminopyrimidine hydrochloride is dissolved in methanol and treated with excess sodium methoxide. The mixture is refluxed for ten minutes and diluted with 200 ml. of water and 10 ml. of 30% hydrogen peroxide. The resulting mixture is refluxed for ten minutes, then cooled and filtered to give 2,4,7-triamino-6-(4-trifluoromethylphenyl)pteridine.

EXAMPLE 13

By the method of Example 4, 8.0 g. of 4,5,6-triamino-2-methylpyrimidine and 5.0 g. of glyoxylamide are reacted to give 4,7-diamino-2-methyl-6-pteridinecarboxamide.

In the same manner 4,7-diamino-2-ethyl-6-pteridinecarboxamide is prepared from 4,5,6-triamino-2-ethylpyrimidine and glyoxylamide.

EXAMPLE 14

A mixture of 9.0 g. of 2,4,5,6-tetra-aminopyrimidine hydrochloride in 40 ml. of methanol and 25 ml. of acetic acid is heated at 50° C. and treated first with a solution of 5 g. of sodium cyanide in 17 ml. of water and then with a solution of 9.5 g. of 3-cyclohexene-1-carboxaldehyde in 10 ml. of methanol. The resulting mixture is kept at −20° C. overnight. Upon filtration there is obtained 2,4,6-triamino-5-(α - cyano - 3 - cyclohexylmethylamino) pyrimidine, M.P. 134–135° C.

Refluxing the above prepared cyano compound with 5.0 g. of sodium methoxide in 80 ml. of methanol for ten minutes, adding 75 ml. of water and 12 ml. of 30% hydrogen peroxide, allowing the resulting mixture to stand at room temperature, filtering and recrystallizing from methanol gives 2,4,7 - triamino-6-(3 - cyclohexenyl)pteridine, M.P.>350° C.

Similarly reacting 2,4,5,6-tetra-aminopyrimidine hydrochloride with 4-pentenal, refluxing the resulting 2,4,6-triamino-5-(1-cyano-4-pentenylamino)pyrimidine with sodium methoxide in methanol and treating the resulting dihydropteridine with hydrogen peroxide gives 2,4,7-triamino-6-(3-butenyl)pteridine. This material (500 mg.) in dilute dimethylacetamide is reacted with hydrogen bromide gas to give the hydrobromide salt.

In a similar manner reacting 2,4,5,6-tetraaminopyrimidine with 3 - hexynal gives 2,4,6-triamino-5-(1-cyano-3-hexynylamino)pyrimidine which is refluxed with sodium methoxide in methanol. The resulting dihydropteridine is oxidized with hydrogen peroxide to give 2,4,7-triamino-6-(2-pentynyl)pteridine.

EXAMPLE 15

A mixture of 9 g. of 2,4,5,6-tetra-aminopyrimidine hydrochloride, 10 g. of cinnamaldehyde, 5 g. of sodium cyanide in 95 ml. methanol and 60 ml. of acetic acid are reacted as in Example 14 to give 2,4,6-triamino-5-(α-cyanocinnamylamino)pyrimidine, M.P. 134–136° C.

A 9.3 g. sample of 2,4,6-triamino-5-(α-cyanocinnamylamino)pyrimidine acetate (prepared by treating the free base with excess acetic acid, concentrating and filtering) is added to a solution of 9.0 g. of sodium methoxide in 200 ml. of methanol. The mixture is stirred and refluxed for two minutes. The precipitate was collected, washed with methanol, dried and recrystallized from ethanol to give 2,4,7-triamino-6-β-phenethylpteridine, M.P., 296–298° C. (dec.).

EXAMPLE 16

A solution of 9 g. of 2,4,5,6-tetra-aminopyrimidine hydrochloride in 45 ml. methanol and 45 ml. acetic acid is treated with 5 g. of sodium cyanide in 20 ml. of water and 10 g. of phenylpropargylaldehyde in 10 ml. of methanol. The mixture is heated to 50° C., then cooled for three hours at 7° C. On filtering there is obtained 2,4,6-triamino - 5 - (α - cyano - γ - phenylproparglyamino) pyrimidine.

To a solution of 6.0 g. of sodium methoxide in 125 ml. of methanol is added 6.0 g. of 2,4,6-triamino-5-(α-cyano-γ-phenylpropargylamino)pyrimidine. The mixture is refluxed for three minutes, then cooled and filtered. The solid product is recrystallized from ethanol to give 2,4,7-triamino-6-styrylpteridine, M.P. 345–347° C. (dec.).

One gram of 2,4,7 - triamino - 6 - styrylpteridine is dissolved in dilute hydrochloric acid to give, on cooling and filtering, the hydrochloride salt.

EXAMPLE 17

A solution of 36 g. of 2,6-dichloro-5-nitro-4- pyrimidine carboxylic acid methyl ester in 720 ml. of 10% ammonia in methanol is heated in an autoclave at 100° C. for six hours. The mixture is allowed to stand overnight, then is evaporated and the residue is dissolved in dilute hydrochloric acid. Adding ammonia, filtering the precipitate and recrystallizing it from dimethylformamide gives 2,6-diamino-4-carbamoyl-5-nitropyrimidine.

A mixture of 1.0 g. of 2,6 - diamino - 4 - carbamoyl-5-nitropyrimidine, 200 ml. of methanol and ½ teaspoon of Raney nickel catalyst is hydrogenated. The resulting mixture is filtered and the alcohol is evaporated from the filtrate. The residue is recrystallized from water to give 2,5,6-triamino-4-carbamoylpyrimidine, M.P. 286–288° C. (dec.).

A sample of 2,5,6-triamino-4-carbamoylpyrimidine in methanol and acetic acid is heated to 50° C. and treated with aqueous sodium cyanide and benzaldehyde in methanol to give 2,6 - diamino-4-carbamoyl-5-(α-cyanobenzylamino)pyrimidine. Refluxing this pyrimidine with sodium methoxide in methanol for 10 minutes, adding aqueous hydrogen peroxide to the solution and allowing it to stand at room temperature for five hours gives, after filtering and recrystallizing in methanol, 2,7-diamino-4-carbamoyl-6-phenylpteridine.

EXAMPLE 18

Five grams of 2,4,5,6-tetra-aminopyrimidine in methanol and acetic acid is heated to 50° C. and treated first with 3.5 g. of sodium cyanide in water and then with 5.8 g. of α,α,α - trifluoroacetaldehyde. Cooling and filtering gives 2,4,6-triamino-5-(α-cyano-β,β,β-trifluoroethylamino) pyrimidine which on refluxing with sodium ethoxide in ethanol, then cooling, concentrating and refluxing the residue with aqueous hydrogen peroxides gives 2,4,7-triamino-6-trifluoromethylpteridine.

This compound (500 mg.) is dissolved in hot dilute phosphoric acid. Cooling separates the phosphate salt.

EXAMPLE 19

By the procedure of Example 1, 10 g. of 2,5,6-triaminopyrimidine is reacted with slight excess of one molar equivalent of benzaldehyde in acetic acid and absolute ethanol. A stream of hydrogen peroxide gas is passed into the solution and after working up as in Example 1 there is obtained 2,6 - diamino-5-(α-cyanobenzylamino)pyrimidine. Refluxing this pyrimidine with sodium methoxide in methanol and treating the resulting dihydropteridine with hydrogen peroxide gives 2,7-diamino-6-phenylpteridine.

Similarly reacting molar equivalent amounts of 2,5,6-triamino - 4 - methylpyrimidine and 2,5,6 - triamino - 4-pyrimidinol with benzaldehyde, refluxing the resulting cyano intermediate with sodium methoxide in methanol and oxidizing the intermediate dihydropteridine with hydrogen peroxide gives 2,7-diamino-4-methyl - 6 - phenylpteridine and 2,7 - diamino-4-hydroxy-6-phenylpteridine, respectively.

EXAMPLE 20

2,5,6-triamino-4-phenylpyrimidine is prepared as follows:

Known 2 - amino - 4 - phenyl - 6 - hydroxypyrimidine is coupled with benzenediazonium chloride in aqueous solution at the 5-position. The 6-hydroxy compound is converted to a 6-chloro compound with phosphorous oxychloride then reacted with butanolic ammonia to form the 6-amine. The coupled diazonium moiety is then removed by catalytic reduction to give the desired triamino compound, M.P. 220–222° C.

A mixture of 20 g. of 2,5,6-triamino-4-phenylpyrimidine in methanolic acetic acid at 50° C. is treated with an aqueous solution of 6 g. of sodium cyanide then with a methanol solution of 7.5 g. of glyoxylamide. The resulting mixture is cooled and filtered to give 2,6-diamino-5-(α-cyanocarbamoylmethylamino)-4-phenylpyrimidine.

The above prepared cyano compound is refluxed with sodium methoxide in methanol then treated with aqueous hydrogen peroxide to give 2,7-diamino-4-phenyl-6-pteridine carboxamide.

What is claimed is:

1. The method of preparing substituted pteridines which comprises reacting a 5,6-diaminopyrimidine having the following formula:

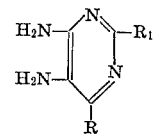

in which:

R is a member selected from the group consisting of hydrogen, lower alkyl, phenyl, thienyl, carbamoyl, hydroxyl and

$R_1$ is a member selected from the group consisting of hydrogen, lower alkyl, phenyl, thienyl and amino and $R_2$ is a member selected from the group consisting of hydrogen and lower alkyl with $R_3$CHO in which $R_3$ is a member selected from the group consisting of hydrogen, lower alkyl, halogenated lower alkyl, cycloalkyl, lower alkenylalkylene, cycloalkenylalkylene, phenyl-lower alkenylalkylene, lower alkynylalkylene, phenyl-lower alknylalkylene, phenyl, thienyl, furyl, pyrrolyl, pyrimidyl, pyridyl, quinolyl, thiazolyl, benzyl, phenethyl, thenyl and carbamoyl in a lower alkanol solution at about 45–90° C. to give a Schiff base having the following formula:

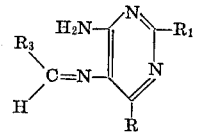

in which R, R₁ and R₃ are as defined above; reacting said Schiff base with R₅CN in which R₅ is a member selected from the group consisting of hydrogen and alkali metal, and an acid selected from the group consisting of a mineral acid and a lower alkanoic acid at about 45–90° C. to give a 6-amino-5-cyanomethyl-aminopyrimidine having the following formula:

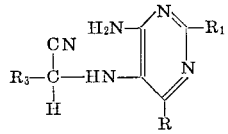

in which R, R₁ and R₃ are as defined above; treating said 6-amino-5-cyanomethylaminopyrimidine at an elevated temperature of about 45–85° C. with a lower alkanol solution of a base selected from the group consisting of an alkali metal lower alkoxide and an alkali metal cyanide to give a 7-amino-5,6-dihydropteridine having the following formula:

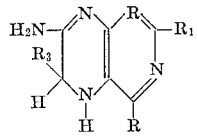

in which R, R₁ and R₃ are as defined above; and oxidizing said 7-amino-5,6-dihydropteridine to give a 7-aminopteridine having the following formula:

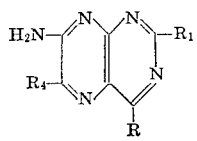

in which R and R₁ are as defined above and R₄ is R₃ as defined above.

2. The method of claim 1 characterized by the reaction of said 5,6-diaminopyrimidine with an acetonitrile derivative having the following formula:

in which R₃ is as defined in claim 1 and X is a member selected from the group consisting of a reactive halogen, hydroxy, OSO₂C₆H₅, OSO₂C₆H₄CH₃ and pyridinium halide to give said 6-amino-5-cyanomethylaminopyrimidine.

3. The method of claim 1 in which R and R₁ are amino, R₃ and R₄ are phenyl and R₅ is hydrogen.

4. The method of claim 1 in which R and R₁ are amino, R₃ and R₄ are thienyl and R₅ is hydrogen.

5. The method of claim 1 in which R and R₁ are amino, R₃ and R₄ are 1-methyl-2-pyrrolyl and R₅ is hydrogen.

6. The method of claim 1 in which R is amino and R₁, R₃, R₄ and R₅ are hydrogen.

7. The method of preparing substituted pteridines which comprises reacting a 5,6-diaminopyrimidine having the following formula:

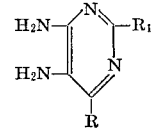

in which:

R is a member selected from the group consisting of hydrogen, lower alkyl, phenyl, thienyl, carbamoyl, hydroxyl and

R₁ is a member selected from the group consisting of hydrogen, lower alkyl, phenyl, thienyl and amino and R₂ is a member selected from the group consisting of hydrogen and lower alkyl with R₃CHO in which R₃ is a member selected from the group consisting of α,β-lower alkenyl, α,β-cycloalkenyl, phenyl-α,β-lower alkenyl, α,β-lower alkynyl and phenyl-α,β-lower alkynyl in a lower alkanol solution at about 45–90° C. to give a Schiff base having the following formula:

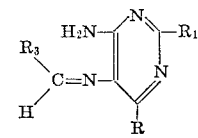

in which R, R₁ and R₃ are as defined above; reacting said Schiff base with R₅CN in which R₅ is a member selected from the group consisting of hydrogen and alkali metal, and an acid selected from the group consisting of a mineral acid and a lower alkanoic acid at about 45–90° C. to give a 6-amino-5-cyanomethylaminopyrimidine havin gthe following formula:

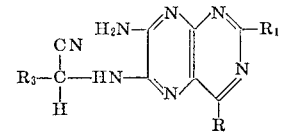

in which R, R₁ and R₃ are as defined above; and treating said 6-amino-5-cyanomethylaminopyrimidine at an elevated temperature of about 45–85° C. with a lower alkanol solution of a base selected from the group consisting of an alkali metal lower alkoxide and an alkali metal cyanide to give a 7-amino-5,6-dihydropteridine having the following formula:

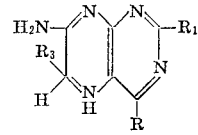

in which R, R₁ and R₃ are as defined above; which isomerizes to give a 7-aminopteridine having the following formula:

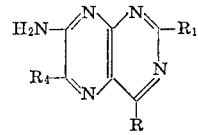

in which R and R₁ are as defined above and R₄ is lower alkyl, cycloalkyl, phenyl-lower alkyl, α,β-lower alkenyl and α,β-phenyl-lower alkenyl.

8. A chemical compound of the class consisting of a free base and its nontoxic, pharmaceutically acceptable acid addition salts said free base having the following formula:

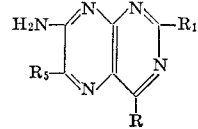

in which:

R is a member selected from the group consisting of hydrogen, lower alkyl, phenyl, thienyl, carbamoyl, hydroxyl and

$R_1$ is a member selected from the group consisting of hydrogen, lower alkyl, phenyl, thienyl and amino;
$R_2$ is a member selected from the group consisting of hydrogen and lower alkyl and
$R_5$ is a member selected from the group consisting of α,β-lower alkenyl phenyl-α,β-lower alkenyl, lower alkenylalkylene, cycloalkenylalkylene, phenyl-lower alkenylalkylene, lower alkynylalkylene and phenyl-lower alkynylalkylene.

9. 2,4,7-triamino-6-(3-cyclohexenyl)pteridine.
10. 2,4,7-triamino-6-styrylpteridine.
11. 2,4,7-triamino-6-thiazolylpteridine.
12. 2,4,7-triamino-6-(2-furyl)pteridine.
13. A member selected from the group consisting of a compound of the formula:

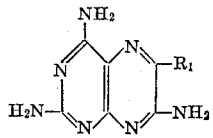

wherein $R_1$ is a member of the group consisting of pyridyl, lower alkylpyridyl, thiazolyl and lower alkylthiazolyl, and physiologically acceptable acid addition salts thereof.

14. 2,4,7-triamino-6-pyridylpteridine.
15. 2,4,7-triamino-6-(2-pyridyl)pteridine.
16. 2,4,7-triamino-6-(4-pyridyl)pteridine.

References Cited

UNITED STATES PATENTS

| | | | |
|---|---|---|---|
| 2,211,710 | 8/1940 | Zerweck et al. | 260—256.4 XR |
| 2,878,144 | 1/1959 | Schafer et al. | 260—240 |
| 3,031,446 | 4/1962 | Zimmer et al. | 260—240 |
| 2,963,478 | 12/1960 | Weinstock | 260—251.5 |
| 2,784,188 | 3/1957 | Angier et al. | 260—256.4 |
| 3,111,521 | 11/1963 | Hoeble et al. | 260—256.4 |
| 3,256,283 | 6/1966 | Ospene et al. | 260—251.5 |
| 3,290,312 | 12/1966 | Tschesche et al. | 260—251.5 |

FOREIGN PATENTS 936,948   12/1955   Germany.

OTHER REFERENCES

Taube et al.: Ber. Deu. Chem., vol. 39, pp. 227–235 (1906).

Brown: The Pyrimidines, pp. 316–317, 321–323, 389–391 and 398, Interscience Publishers, New York (1962).

ALEX MAZEL, *Primary Examiner.*

D. DAUS, *Assistant Examiner.*

U.S. Cl. X.R.

260—251.5, 256.4, 256.5, 999